July 14, 1959  M. B. GARDNER  2,894,721

PRINTERS' FRICTION-LOCKING QUOIN

Filed May 19, 1958

INVENTOR.
MILTON B. GARDNER 2,894,721

PRINTERS' FRICTION-LOCKING QUOIN

Milton Bliss Gardner, Ivyland, Pa.

Application May 19, 1958, Serial No. 736,400

1 Claim. (Cl. 254—42)

This invention relates to printers' quoins and more particularly to the specific means for retaining the movable parts of the quoins in "locked up" position.

Figure 1:
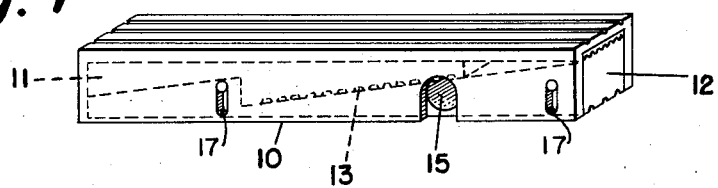
Figure 2:
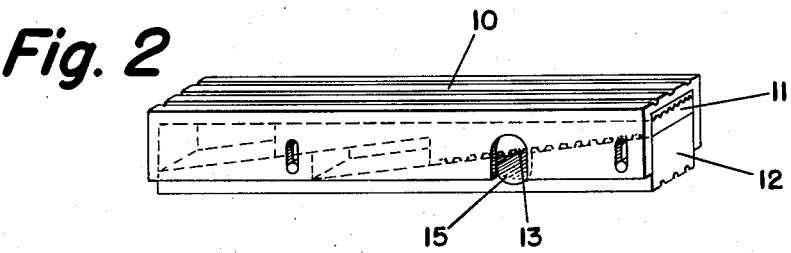
Figure 3:
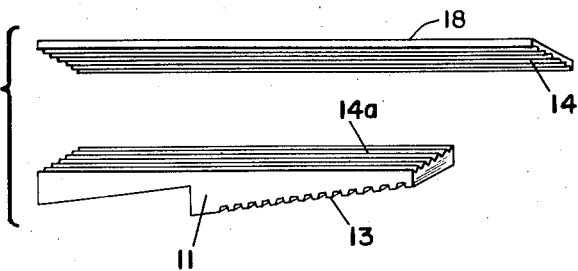
Figure 4:
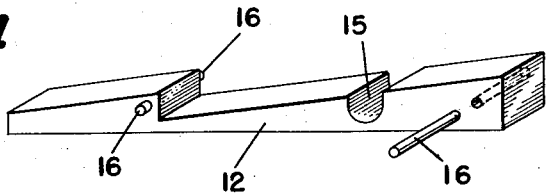

This invention provides the foregoing by means of a friction locking arrangement hereafter more fully described, reference being had to the accompanying drawings in which:

Figure 1 is a perspective view of a quoin embodying the invention, in which the quoin is shown in open or unlocked position, Figure 2 is a similar view showing the quoin in "locked-up" position, Figure 3 is an expanded view of the friction-locking strip and one of the quoin members which cooperates therewith, and Figure 4 is a perspective view of the other quoin member.

Like reference numerals apply to like parts in all of the figures.

The quoin comprises a pressed steel channel-housing 10, Figs. 1 and 2, in which is mounted two cooperating wedge shaped bars 11 and 12 for limited sliding action therein by means of a manually operated pinion key, engaging the teeth 13 cut in one of the bars, while it turns from a fixed position in a circular groove 15, Fig. 4, in the adjoining surface of the other wedge bar, thus causing the quoin to expand or contract according as the key is turned.

No new or novel feature is claimed for this selfsame operating principle as in the original two-piece wedge bar quoin. The only new and novel feature claimed for this quoin is the frictional retention of the wedge bars in position when "locked up."

This result is obtained by the interposition of a suitable metal strip 18, Fig. 3, such as Phosphor bronze, inserted between the inside top surface of the channel housing and the upper surface of the adjacent wedge bar, said strip and said bar having elongated V teeth cut to match on their adjoining surfaces 14 and 14a, which interlock under pressure and produce resistance to sliding, which we have designated "friction locking." The threaded friction strip extends the whole length of the channel housing and is anchored immovably to its top inner surface, while the wedge bar facing it is likewise threaded the whole length of it, although it is shorter than the strip by the length of one section of the tapered steps (multiples of which making up the different lengths of quoins) to allow for travel. The cover is retained in position (movable vertically) by pins 16, which extend through the lower bar and engage slots 17 in the cover.

This locking function of the enmeshed V threads increases in proportion to the length of the quoin and the corresponding pressure exerted on it in the lock-up so as to give commensurate retaining or locking security to the whole length of composition covered by the quoin in the locked up chase. But for this same reason, of frictional increase according to the length of quoin, there is in the longer length of quoins a surplus of friction developed beyond what is necessary for secure holding or desirable for free adjustment by the key. Hence a modification of the V thread angle, as used in the shorter qoins, is employed to reduce the friction to the desired point in the longer quoins.

Apart from the desirability of a self-contained one-piece quoin, and its self-locking facility, in particular, I claim nothing beyond the general principle of the old two-piece wedge-bar quoin, having cast-in teeth on their adjoining surfaces and capable of being moved in and out by a toothed pinion key inserted between them into the like pitched teeth. Such quoins required no locking facility as the angles of the wedge bars was slight and their outside contact was generally in wood furniture, whereas in our quoin the angle is much shorter and steeper, in order to obtain compactness, and the sliding bar is against the steel channel top, thus requiring a locking means to secure in position. The use and operation of so simple a device as our quoin will be obvious from the accompanying drawing.

What I claim is:

A printer's quoin comprising; first and second quoin members located in generally parallel juxtaposed relation and having flat generally parallel outer sides and inclined inner faces, said members having cooperating portions against which force may be applied to cause relative longitudinal motion between said quoin members, a channel member having a back portion and side portions enclosing said second quoin member and operably connected to said first quoin member to confine said second quoin member to longitudinal movement between said first quoin member and said back portion, a rectangular strip mounted between said second quoin member and said back portion and anchored to said back portion, said second quoin member and said strip having cooperating faces provided with interengaging matching elongated teeth on their adjoining surfaces which interlock under pressure and produce resistance to sliding movement between said strip and said second quoin member, thus holding the expanded quoin immovably in locked-up position.

References Cited in the file of this patent

UNITED STATES PATENTS

| | | |
|---|---|---|
| 2,547,789 | Skeel | Apr. 3, 1951 |
| 2,571,263 | Lee et al. | Oct. 16, 1951 |